United States Patent
Arsenault et al.

(10) Patent No.: US 6,601,998 B2
(45) Date of Patent: *Aug. 5, 2003

(54) OPTICAL WAVEGUIDE ASSEMBLY FOR INTERFACING A TWO-DIMENSIONAL OPTOELECTRONIC ARRAY TO FIBER BUNDLES

(75) Inventors: Barry R. Arsenault, Burlinton, MA (US); Jason S. Bundas, Merrimack, NH (US)

(73) Assignee: Teraconnect, INC, Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/021,978

(22) Filed: Dec. 13, 2001

(65) Prior Publication Data

US 2002/0106165 A1 Aug. 8, 2002

Related U.S. Application Data

(60) Provisional application No. 60/255,328, filed on Dec. 13, 2000.

(51) Int. Cl.⁷ .................................................. G02B 6/36
(52) U.S. Cl. ........................................... 385/88; 385/92
(58) Field of Search .......................... 385/14, 54–94, 385/129–132, 139, 146

(56) References Cited

U.S. PATENT DOCUMENTS

| | | | |
|---|---|---|---|
| 4,943,136 A | * | 7/1990 | Popoff ........................ 385/46 |
| 5,113,460 A | | 5/1992 | Hakoun et al. |
| 5,192,278 A | | 3/1993 | Hayes et al. |
| 5,263,108 A | * | 11/1993 | Kurokawa et al. ............. 385/89 |
| 5,327,517 A | * | 7/1994 | Yamada et al. ............. 385/137 |
| 5,359,687 A | | 10/1994 | McFarland et al. |
| 5,469,526 A | | 11/1995 | Rawlings |
| 5,535,036 A | | 7/1996 | Grant |
| 5,579,426 A | | 11/1996 | Li et al. |
| 5,625,734 A | | 4/1997 | Thomas et al. |
| 5,631,988 A | | 5/1997 | Swirhun et al. |
| 5,748,818 A | | 5/1998 | Weiss et al. |
| 5,764,834 A | | 6/1998 | Hultermans |
| 5,768,456 A | | 6/1998 | Knapp et al. |
| 5,909,526 A | | 6/1999 | Roth et al. |
| 5,943,459 A | | 8/1999 | Hildebrand |
| 6,027,256 A | | 2/2000 | Nightingale et al. |
| 6,048,107 A | | 4/2000 | Pubanz |
| 6,091,874 A | | 7/2000 | Higashi et al. |
| 6,097,871 A | | 8/2000 | De Dobbelaere et al. |
| 6,115,515 A | | 9/2000 | Itoh et al. |
| 6,219,480 B1 | | 4/2001 | Cassarly et al. |
| 6,272,155 B1 | | 8/2001 | Sekiguchi |
| 6,296,400 B1 | | 10/2001 | Uchiyama et al. |
| 6,361,218 B1 | * | 3/2002 | Matasek et al. ............. 385/53 |
| 6,364,539 B1 | * | 4/2002 | Shahid ........................ 385/65 |
| 6,459,842 B1 | * | 10/2002 | Arsenault et al. ........... 385/134 |
| 2002/0126962 A1 | * | 9/2002 | Kadar-Kallen et al. ....... 385/88 |
| 2002/0181892 A1 | * | 12/2002 | Shekel et al. ................. 385/83 |

FOREIGN PATENT DOCUMENTS

| | | |
|---|---|---|
| WO | WO 98/14813 | 4/1998 |
| WO | WO 01/46729 A1 | 6/2001 |

OTHER PUBLICATIONS

PCT International Search Report dated May 31, 2002 of International Application No. PCT/US01/48739 filed Dec. 13, 2001.

* cited by examiner

Primary Examiner—Rodney Bovernick
Assistant Examiner—M. R. Connelly-Cushwa
(74) Attorney, Agent, or Firm—Maine & Asmus

(57) ABSTRACT

The invention in the simplest form is a low-profile optical waveguide assembly for interfacing a two-dimensional optoelectronic array to standard fiber bundles. The present invention serves both to bend light and fan out light-carrying guides and to transition from the optoelectronic array pitch to an industry standard pitch for connectorization. There are several embodiments considered herein, however the preferred embodiments are for an optical waveguide assembly that includes a waveguide housing supporting a plurality of waveguide sheets, each sheet includes an array of waveguides feeding a plurality of industry standard ferrules.

12 Claims, 9 Drawing Sheets

OPTICAL WAVEGUIDE ASSEMBLY FOR INTERFACING A TWO-DIMENSIONAL OPTOELECTRONIC ARRAY TO FIBER BUNDLES

CROSS REFERENCE TO RELATED APPLICATIONS

This application claims priority under 35 U.S.C. Section 119 from a U.S. Provisional Patent Application serial No. 60/255,328 filed on Dec. 13, 2000, which is incorporated herein by reference for all purposes. A related application entitled A PACKAGING SYSTEM FOR TWO-DIMENSIONAL OPTOELECTRONIC ARRAYS is filed concurrently with the present application on Dec. 13, 2001 and is incorporated by reference herein.

BACKGROUND OF THE INVENTION

1. Field of the invention

The present invention relates to the optoelectronic connectivity and more specifically, the interconnection of an optical array to fiber optic bundles.

2. Background Art

As processing speeds increase and technology improves, data is being transferred at very high rates. However, one problem with high into data transfer is that each leg in the process must be capable of the high rate transfer or a bottleneck occurs. This problem holds true for data transfer within an integrated circuit, from one chip to another, from one integrated circuit board to another, and from system to system.

In the field of high-speed communications, increasing data transmission rates have been hindered by the limitations posed by fiber optics connectivity. In particular, increasing transmission density is difficult because the number of data transmission lines that conventional packaging technologies can handle is limited.

Glass fiber array pigtails can be used to couple light between two-dimensional optoelectronic arrays and fiber optics. However, the use of glass fibers is prohibitively expensive and glass fiber has associated tolerance stack-up issues. Thus, there are known problems when coupling light between optoelectronic arrays and fiber optics.

Glass fiber array pigtails can be also be used to couple light between two-dimensional optoelectronic arrays and fiber optics, but the extremely high bend radius of glass fiber requires significant clearance above the active device, which is not desirable in high-density packaging. Glass fibers cannot accommodate sharper bends and therefore limits electronic packaging. Other waveguide types utilize mirrors and complicated assemblies to redirect the light beams until the light is properly oriented for reception by an optical fiber.

An additional connectivity problem involves the X and Y pitch of a two-dimensional optoelectronic array that usually differs from the pitch of a standard fiber ribbon. Waveguides with constant pitch therefore are unable to couple light from a nonstandard pitch optoelectronic array to a standard fiber ribbon. One alternative is to limit the pitch of the array to match the footprint of the optical connectors, however this would increase the size of the array and decrease the output potential of the array.

There have been attempts to address the mismatch problem between optical arrays and optical connectors, but they have met with limited success. In general, there are many optical coupling devices that provide connectivity between fiber optic cables and terminate optical fiber cables, such as U.S. Pat No. 5,909,526. There are also schemes for connecting electro-optics that employ complex coordination and alignment problems such as U.S. Pat. No. 5,579,426. But, the prior art still does not address interconnecting to an industry standard connector. As a connector type is adopted and approved as a standard, manufacturers and designers rush to incorporate the connector type to allow standardization in the industry. Thus far there has been a mismatch between the array technology and the connector types in use.

Thus, there is a need for a way to couple light between optoelectronic arrays and fiber optics. There is a also a need for a way to bend the light from one plane to another in a minimum turn radius in order to keep the headroom adequate for packaging considerations. In addition, there is a need for a way to transition from the pitch of a two-dimensional optoelectronic array to the pitch of a standard fiber ribbon to permit industry standard connectorization. What is needed is a method and apparatus for utilizing the advantages of optical technology and providing a mechanism to efficiently interconnect to industry standard connectors such that the electronics industry can fully exploit the bandwidth, speed and efficiency of optics.

SUMMARY OF THE INVENTION

The invention is devised in the light of the problems of the prior art described herein. Accordingly it is a general object or the present invention to provide a novel and useful technique that can solve the problems described herein. In general, one object of the invention provides an optical waveguide assembly that includes a waveguide housing supporting a plurality of waveguide sheets (each including a 1×N array of waveguides), feeding a plurality of industry standard 2×N ferrules.

The present invention features a waveguide assembly that couples light from a two-dimensional optoelectronic array to standard fiber optic ribbon bundles. The invention features a waveguide assembly that provides a low profile angular transition from a two-dimensional optoelectronic array to fiber optic bundles. Further, the invention features a waveguide assembly that provides a pitch transition from an optoelectronic array to a standard fiber ribbon.

In general, in still another aspect, the invention features a waveguide assembly that is easily scalable to various optoelectronic array configurations. For example, an 8×12 array can be separated as illustrated herein to mate with the industry standard 2×12 ferrules. It should be appreciated that as the channel count and pitch spacing of the connector end increase, the present invention is adaptable to new counts and pitch. It is expected that as the connector technology improves, the optoelectronic array technology may also improve and have a continuing need for matching high density high channel count arrays to industry standard connectors.

An object of the invention is an optical waveguide assembly providing an interface between a two-dimensional optoelectronic array and an optical connector, comprising two or more waveguide sheets having an array end and a connector end, wherein each of the waveguide sheets has a plurality of one-dimensional waveguides, and wherein the waveguides at the array end match an optoelectronic array footprint and the waveguides at the connector end match a connector footprint.

Another object is the optical waveguide assembly, further comprising a waveguide housing assembly retaining the waveguide sheets and controlling a row spacing between the waveguide sheets to match the optoelectronic footprint. In addition, further comprising an anchor plate that interconnects with the waveguide housing.

A further object is the optical waveguide assembly, wherein a pitch between each of the waveguides is designed to match the optoelectronic footprint and the connector footprint. Also, wherein the waveguide sheets are generally rectangular and have a protrusion, wherein the waveguides terminate at the protrusion.

The optical waveguide assembly, wherein the waveguides are bendable within the waveguide sheets. The bend can exceed 90 degrees depending upon the waveguide sheet material, waveguide sheet length and amount of acceptable loss. In general, the bending radius should be as large as possible to minimize loss, however the waveguides permit tighter bends than glass fibers.

In addition, an object is the optical waveguide assembly, wherein the waveguide sheets are grouped at the connector end to connect to one or more ferrules. Although 2×12 ferrules are described, other ferrules and connectors are within the scope of the invention.

An object of the present invention is to provide a low-profile optical assembly for interfacing a two-dimensional optoelectronic array to an optical connector, comprising two or more flexible waveguide sheets, wherein each of the waveguide sheets has an array end and a connector end. There are a plurality of one-dimensional waveguides in each of the waveguide sheets, wherein each of the waveguides has an array end pitch at the array end and a connector end pitch at the connector end, and wherein the array end pitch matches a pitch of the optoelectronic array and the connector end pitch matches a pitch of the optical connector. There is also a waveguide housing at the array end of the waveguide sheets for retaining the waveguide sheets, wherein each of the waveguide sheets has an array end spacing at the array end and a connector end spacing at the connector end, and wherein the array end spacing matches a spacing at the optoelectronic array and the connector end spacing matches a spacing at the optical connector.

Another object is the low-profile optical assembly, further comprising an anchor plate that interconnects with the waveguide housing. The waveguide sheets being generally rectangular and having a protrusion extending beyond a plane of the anchor plate, wherein the waveguides terminate in the protrusion.

Still other objects and advantages of the present invention will become readily apparent to those skilled in this art from the following detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

BRIEF DESCRIPTION OF THE FIGURES

The present invention will be readily understood by the following detailed description in conjunction with the accompanying drawings, wherein like reference numerals designate like structural elements, and in which.

DESCRIPTION OF THE PREFERRED EMBODIMENT

The present invention permits an optoelectronic array of multiple channels and pitch spacing to transition to an industry standard optic connection. For example, a 4×12 channel array with 125 $\mu$m pitch is depicted and there is no matching 4×12 optic connector. Thus the present invention separates the array into 2×12 elements and further redefines the pitch to mate with the industry ferrules that use 2×12 channels with 250 $\mu$m pitch between columns and 500 $\mu$m pitch between rows. Furthermore, the present invention allows a sharp 90 degree bend that is not obtainable in the prior art in order to accommodate commercial product specifications requiring short headroom. This low-profile optical waveguide assembly allows for interfacing a two-dimensional optoelectronic array to standard fiber bundles. The present invention serves both to bend light and fan out light-carrying guides and to transition from one pitch, the optoelectronic array pitch, which may vary from 30 to 150 $\mu$m's, to an industry standard pitch such as 250 $\mu$m's. There are several embodiments considered herein, however the preferred embodiments are not to be considered as limiting the present invention to the described embodiments.

Figure 1:
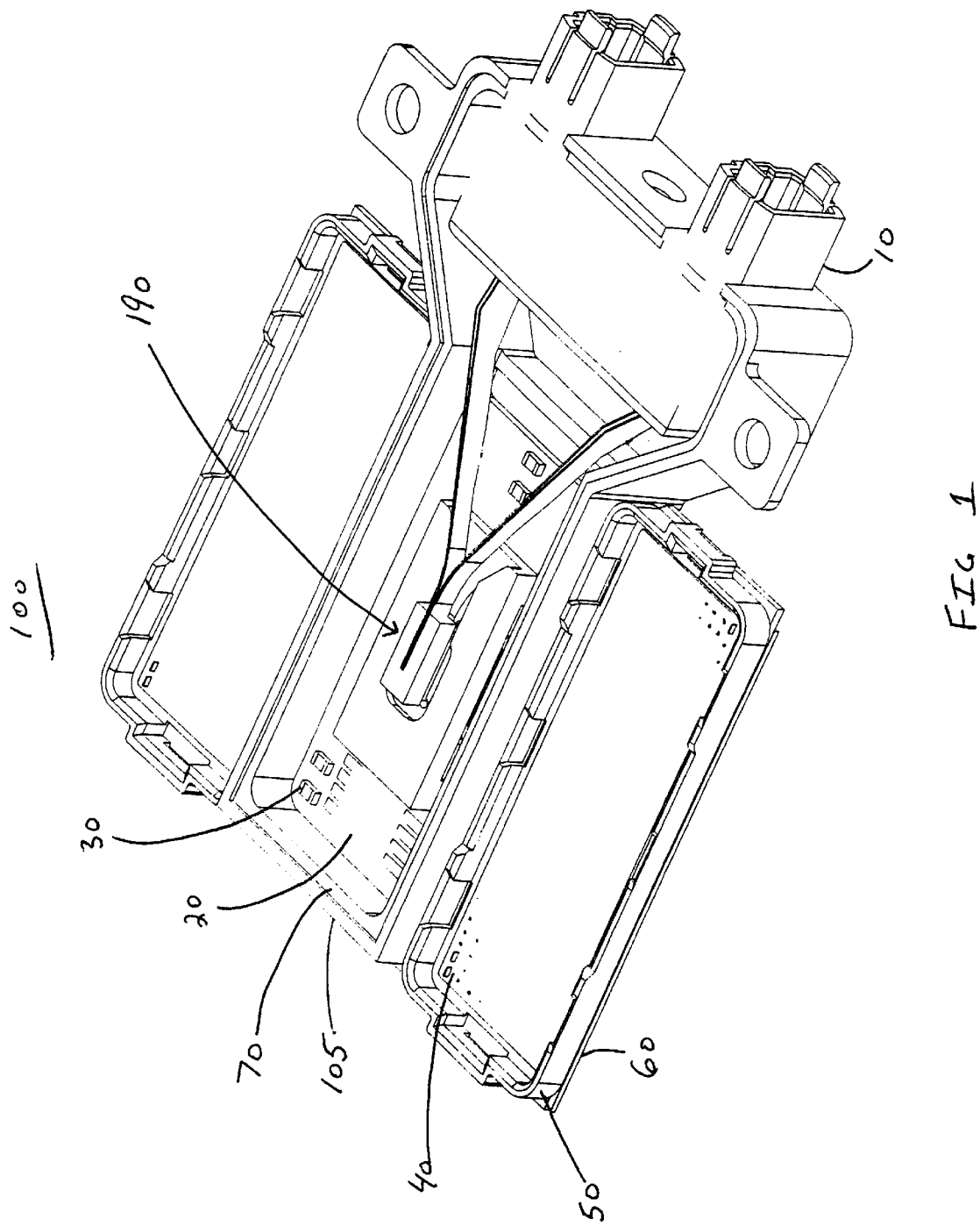
FIG. 1 is a top perspective view of the optoelectronic array assembly with the waveguide assembly mounted in the housing.

One embodiment of the invention is shown in FIG. 1, which depicts the optoelectronic module 100 with the waveguide assembly 190 installed and allowing communication to standard optical connectors 10. The waveguide assembly 190 is nested within a printed circuit board 20 (PCB) and the housing 105 is affixed to the PCB by electrically conductive epoxy. Other securing means are possible, including the use of gaskets between the housing 105 and the PCB 20. The housing can be various materials, such as metal, plastic and ceramic depending upon cost considerations and the intended usage and environment. Various electronics 30 are incorporated onto the PCB 20 and can provide interfacing, processing and storage capabilities. On at least one side of the center housing 105 are an array of electrical contacts 40, which in one embodiment is for a ball grid array (BGA) connector that mates with the BGA housing 50.

On the underside of the PCB 20 is a thermally conductive substrate 60 that is affixed by an adhesive and dissipates and otherwise spreads the heat. A cover (not shown) is placed into the inner groove 70 of the center housing 105 and seals the center housing from the environment as well as provides electromagnetic interference (EMI) benefits.

Figure 2:
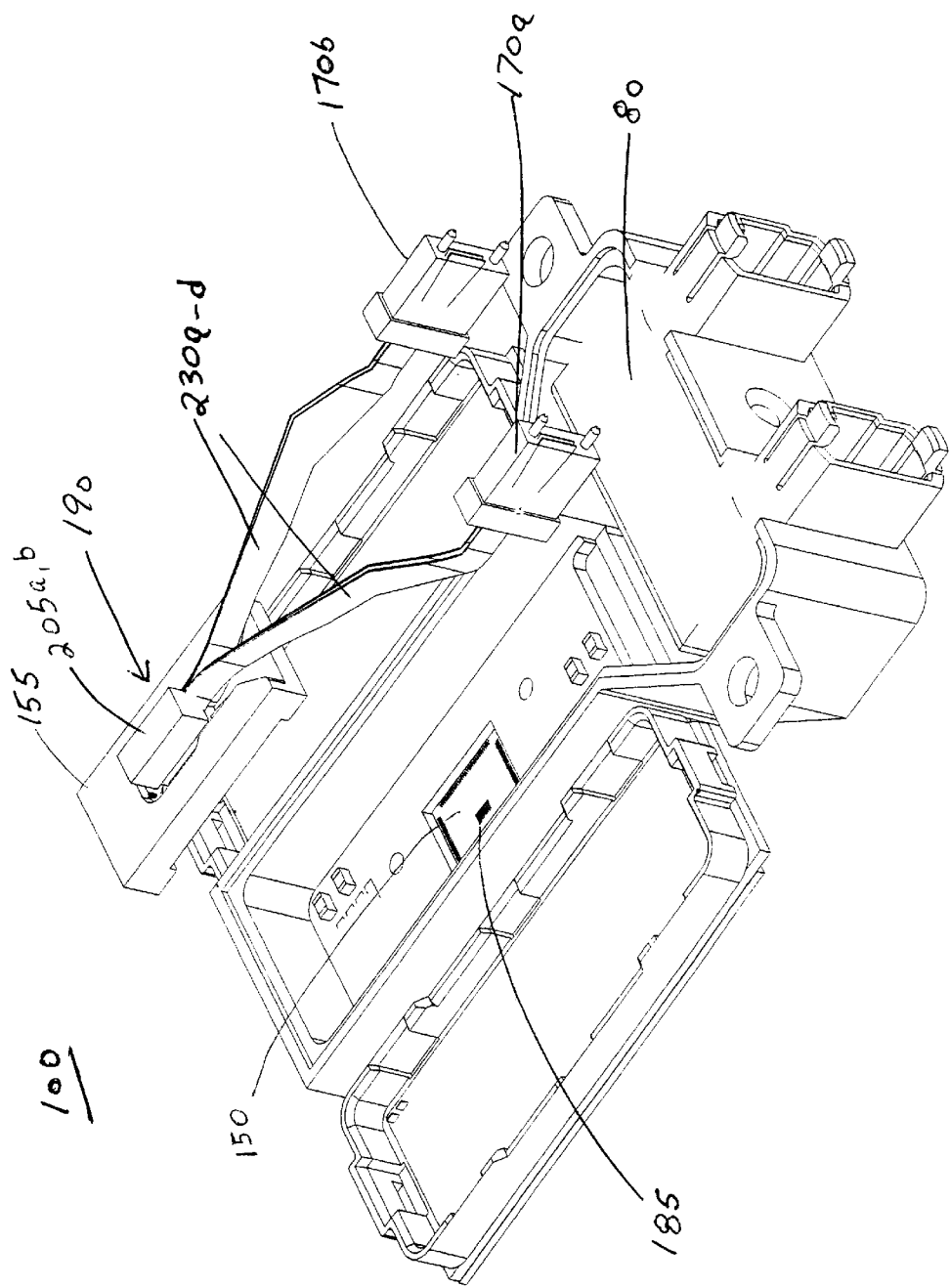
FIG. 2 is a top perspective view of an optoelectronic array assembly with the waveguide assembly displaced from the housing.

FIG. 2 shows the waveguide assembly 190 displaced from the application specific integrated circuit (ASIC) assembly 150 and the ferrules 170 withdrawn from the optical connector housing 10. The ferrules 170 are placed within the connector housing 10 by removing the connector plate 80, wherein the ferrules 170 are assembled to the housing 10. The waveguide assembly 190 secures to the ASIC assembly 150 wherein the anchor plate 155 engages the PCB 20 so that the optoelectronic array 185 is aligned to the matching optical channels of the waveguide housing 205a,b. The waveguide sheets 230a–d provide the flexible interface between the optoelectronic array 185 and the ferrules 170. It should be understood that the optoelectronic array 185 can be a vertical cavity surface emitting laser (VCSEL) array to transmit photonic signals or photodetectors used to receive photonic signals, or a combination of the two. For illustrative purposes VCSEL's are used in the description herein.

Figure 3:
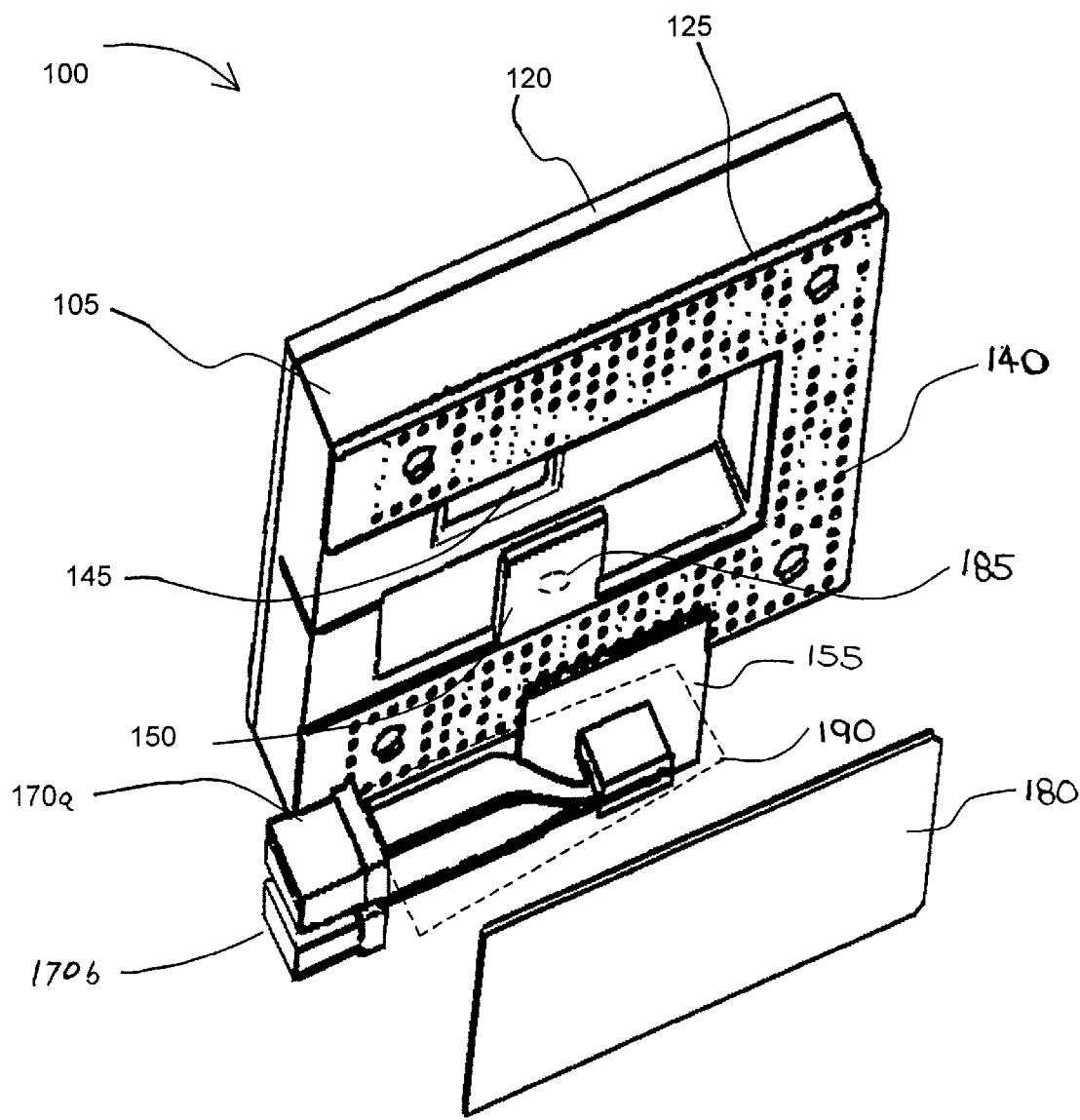
FIG. 3 is a perspective view of the optoelectronic array assembly with the waveguide assembly and bottom cover displaced from the housing.

A different embodiment is illustrated in FIG. 3, wherein the optoelectronic array assembly 100 includes a ceramic housing 105, a heat spreader 120, a solderless land grid array (LGA) 125, an ASIC assembly 150, an anchor plate 155, and a waveguide assembly 190. The bottom cover 180 is used to shield the components from the environment and provide EMI shielding.

The VCSEL array 185 is placed within the ASIC cavity 145 and the anchor plate 155 of the waveguide assembly is aligned and matched to the ASIC 150 with the VCSEL array 185 aligned to the corresponding channels of the waveguide assembly 190. The plurality of electrical contacts 140 on the periphery of the housing allow mating to electrical connectors. The LGA 125 is mounted to the ceramic housing 195 with thermally conductive heat spreader 120 adhered to the opposing side of the ceramic housing 105.

Figure 4:
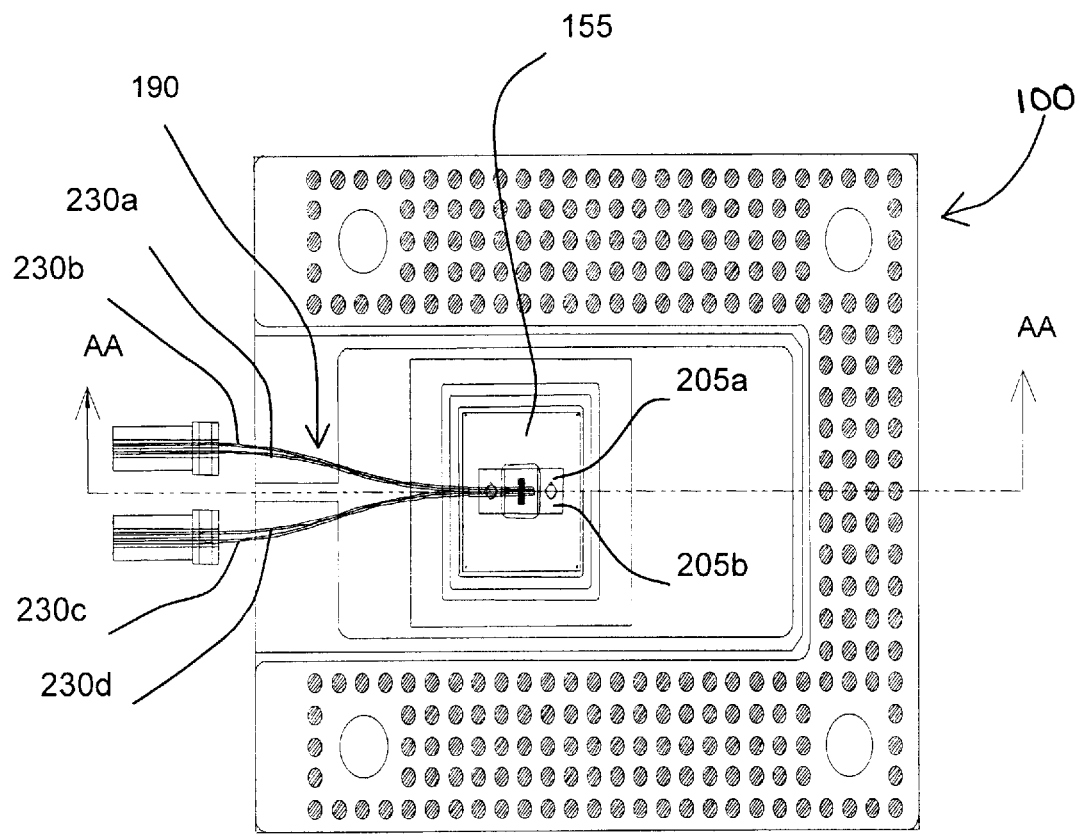
FIG. 4 is a bottom view perspective of the optoelectronic array assembly illustrating the orientation of the waveguide assembly, waveguide sheets and ferrules.

Referring to FIG. 4, waveguide assembly 190 includes waveguide housing members 205a and 205b representing opposing sides of the waveguide housing. Four waveguide sheets 230a–230d are sandwiched between the waveguide housing members 205a and 205b and are held together by an adhesive 151, shown in FIG. 5B. In one example, waveguide housing members 205a, 205b are made of injection molded plastic, and waveguide sheets 230a–230b are made of a polymer conventionally formed in a sheet.

Each waveguide sheet 230a–230d includes a 1×12 array of waveguides 171 formed on the waveguide sheets 230a–230d using a photolithography process. The waveguide technique uses sheets of plastic that are masked using semiconductor processing techniques that exposes light to form discrete fiber channels 171. The geometry and shape/design of each channel or waveguide 171 is tightly controlled as is known to those skilled in the art of photolithography. As this process is a dry processing, the plastic sheets are exposed to form the channels 171 and the waveguides are done without etching or further processing. The waveguide sheets 230a–d are laminated and ready for use. The pitch and channel count for each sheet can be made to match the footprint on either end to whatever is needed at the respective interface. As the connector technology improves and the pitch and channel count changes, the waveguides 171 can be fabricated to match the connectors to any array.

Figure 5A:
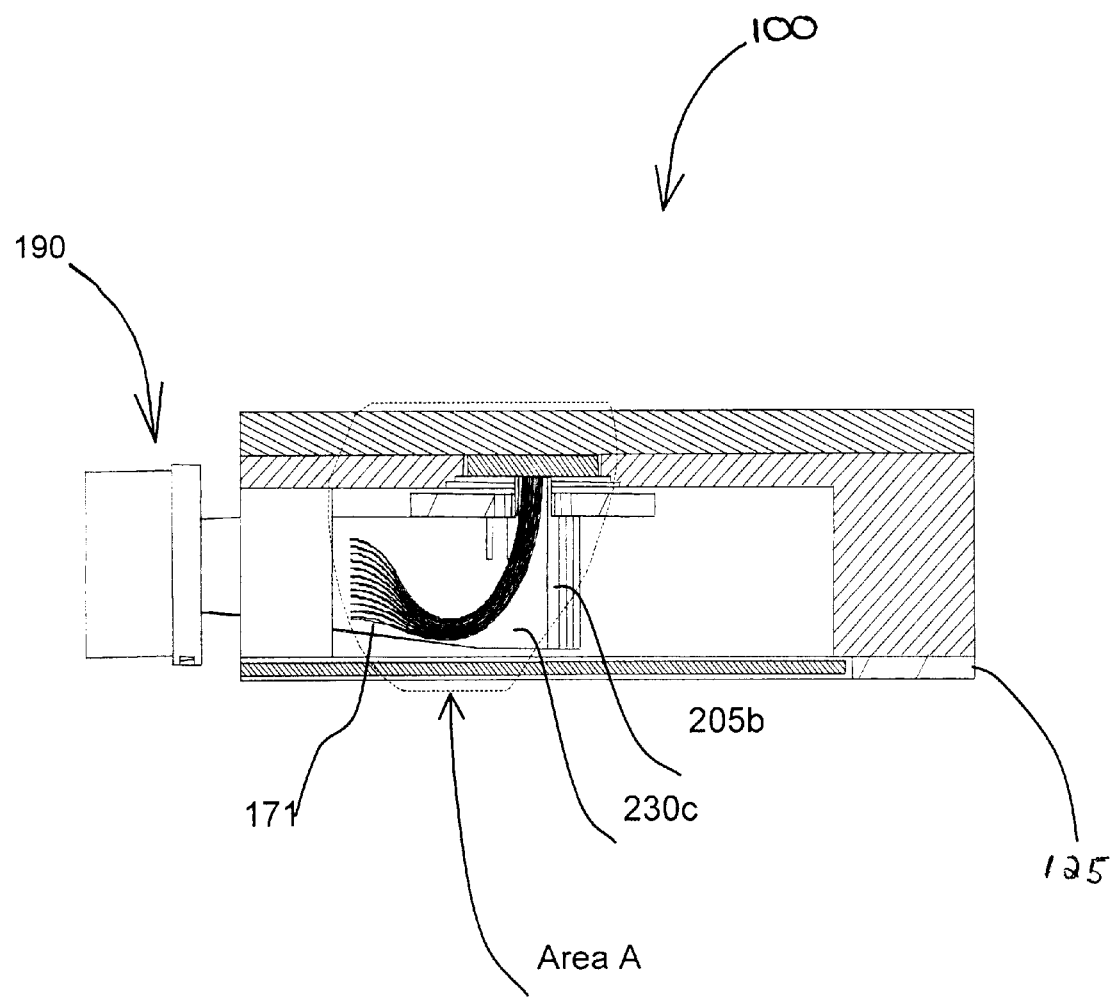
FIG. 5A is a cross-sectional side view of the optoelectronic array assembly showing the paths of the discrete channels of the waveguide sheet
Figure 5B:
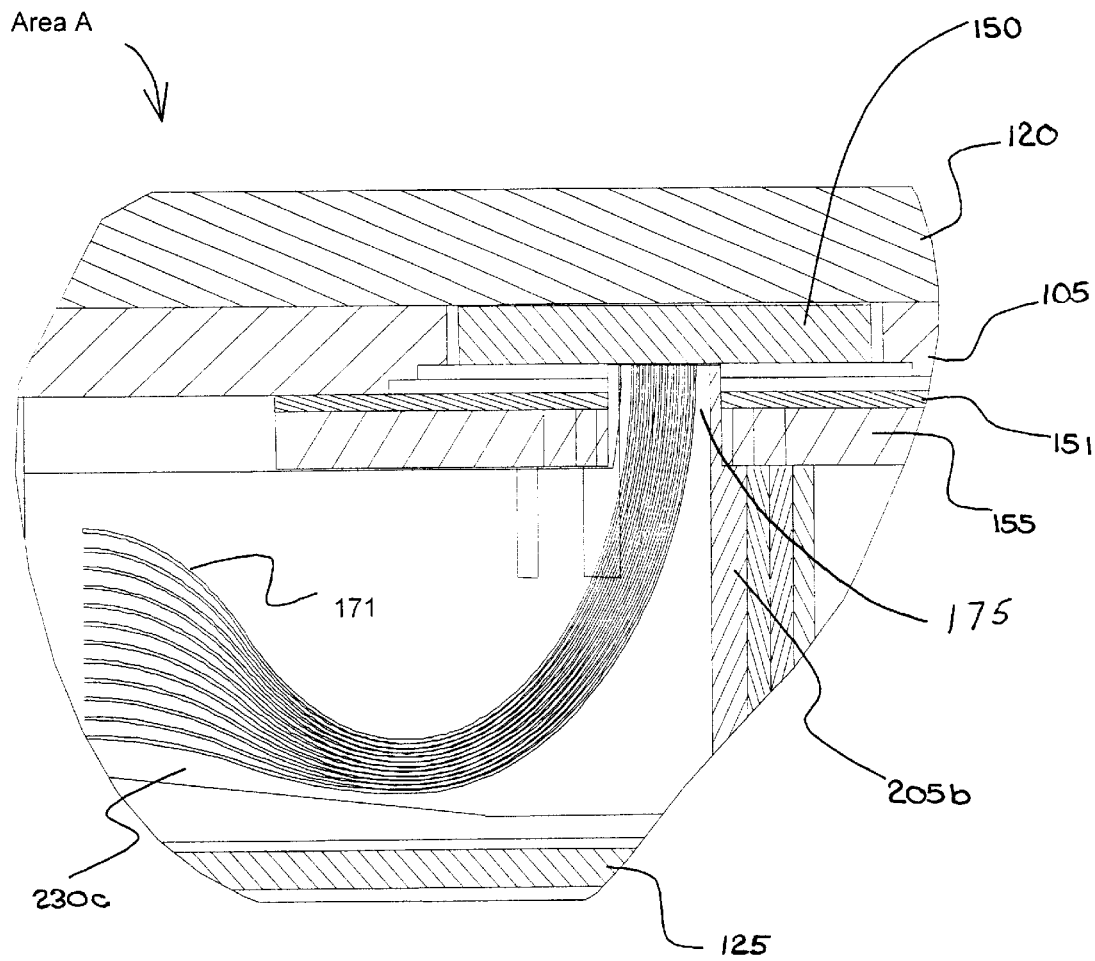
FIG. 5B is a detail exploded view of area A of FIG. 5A, further illustrating the path of the discrete channels and the varied pitch at the different connecting ends and the bend radius

As illustrated in FIGS. 5A and 5B, a waveguide sheet 230c is generally rectangular with a protruding section 175 that is used to extend the waveguides 171 beyond the plane of the anchor plate to optically interconnect with the VCSEL array 185 within the ceramic housing 105. The waveguide housing 205a,b fits within a corresponding cut-out in the anchor plate 155 with the protrusion 175 having the waveguides 171 extending beyond the anchor plate plane. The individual waveguides 171 are stamped/designed into the waveguide sheet 230c in the most efficient manner and match the pitch of the VCSEL array 185 on the protruding end 175 and also match the pitch at the ferrule connector end. The discrete waveguide channels 171 are curved to provide the 90 degree optical interconnect, however in the preferred embodiment the bend radius of the curve is designed to minimize losses. Likewise, the overall length of the waveguide sheet 230c is designed to minimize losses as is known in the art.

With reference to FIGS. 4, 5A and 5B, the four waveguide sheets 230a–230d, are sandwiched between the two waveguide housing members 205a and 205b of waveguide assembly 190, aligned with ASIC assembly 150 and held in position with anchor plate 155. Anchor plate 150 can be stainless steel or other material that allows precision manufacturing and is bonded with epoxy resin 151 to ceramic housing 105.

In one embodiment the alignment of the waveguide assembly 190 is done optically. A camera aligns the assembly in the x/y axis and the waveguide sheets are pressed together and the epoxy fixes the sheets in place within the housing 205a, 205b. For an optoelectronic transmit array on ASIC 150, waveguides 171 receive light from an embedded VCSEL array (not shown) present on ASIC 150. In the case of an optoelectronic receive array on ASIC 150, waveguides 171 deliver light to a photodetector array (not shown) present on ASIC 150.

Figure 6:
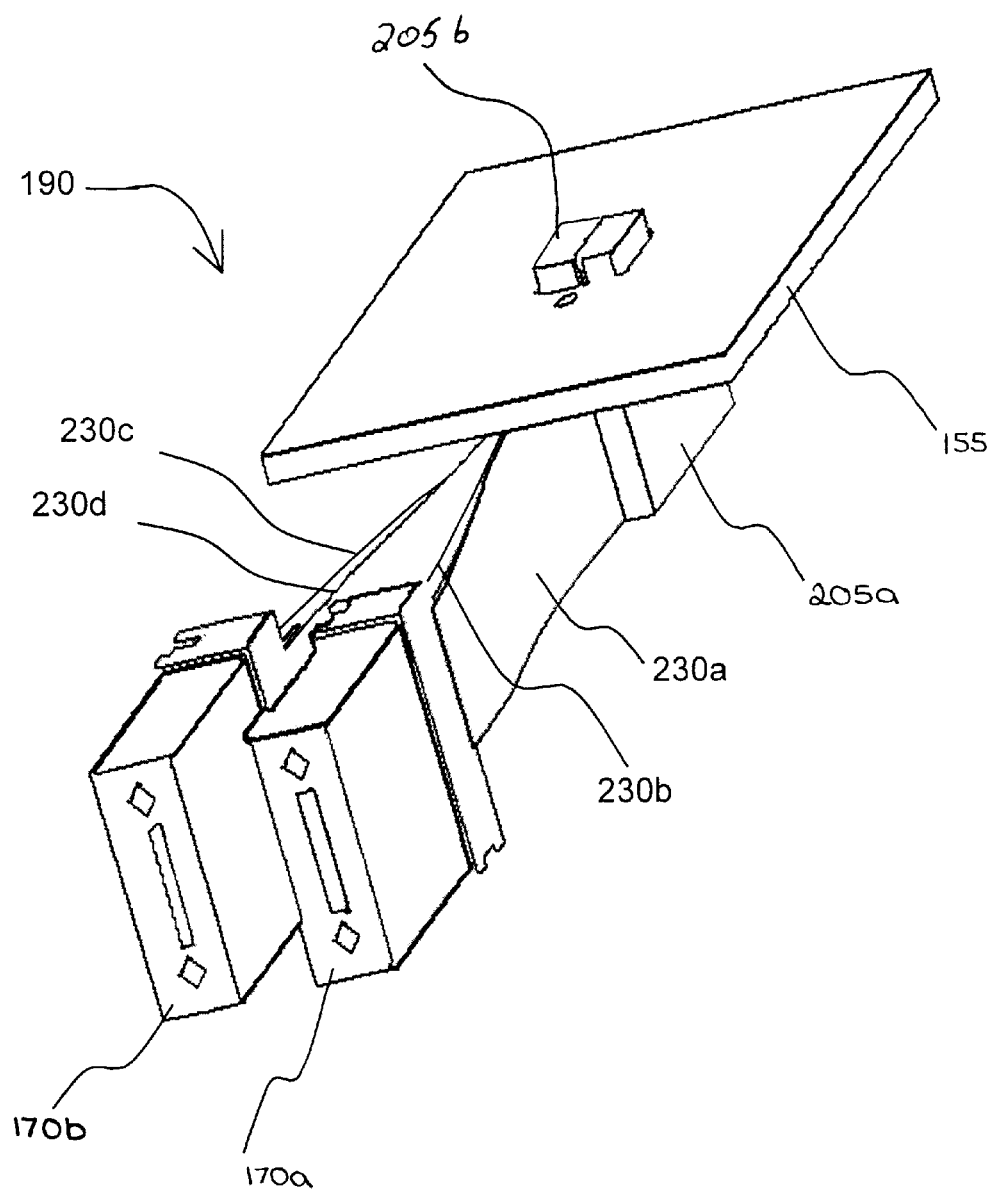
FIG. 6 is a perspective view of the waveguide assembly showing the placement of the waveguide housing within the anchor plate and the connection of the ferrules to the waveguide sheets.

FIG. 6 shows a perspective view of the waveguide assembly 190 of the present invention. Waveguide assembly 190 includes two 2×12 ferrules 170a, 170b fed by waveguide sheets 230a–230d. The protruding section of the waveguide sheet 175 extends the optical channels (not shown) from the waveguide housing 205a, 205b through the anchor plate 155 so that they will be in close communication when mated to the housing and optically communication with the VCSEL array. In this example, a stack of four waveguide sheets 230a–230d (each having a 1×12 array of waveguides 171) are assembled to create a 4×12 array of waveguides 171. The 48 waveguides 171 of waveguide assembly 190 connect to two 2×12 ferrules 170a–170b. Each 2×12 ferrule 170a and 170b is fed by two waveguide sheets 230a, 230b and 230c, 230d, respectively.

Ferrules 170a,b are conventional 2×12 (2 rows of 12 waveguide connections) ferrules and allows for optical transition from the waveguide assembly 190 to standard optical ribbon fibers (not shown). As noted herein, as the technology improves other connectors with increased channel capacity are expected and the present invention is easily adapted to increased channels.

Figure 7:
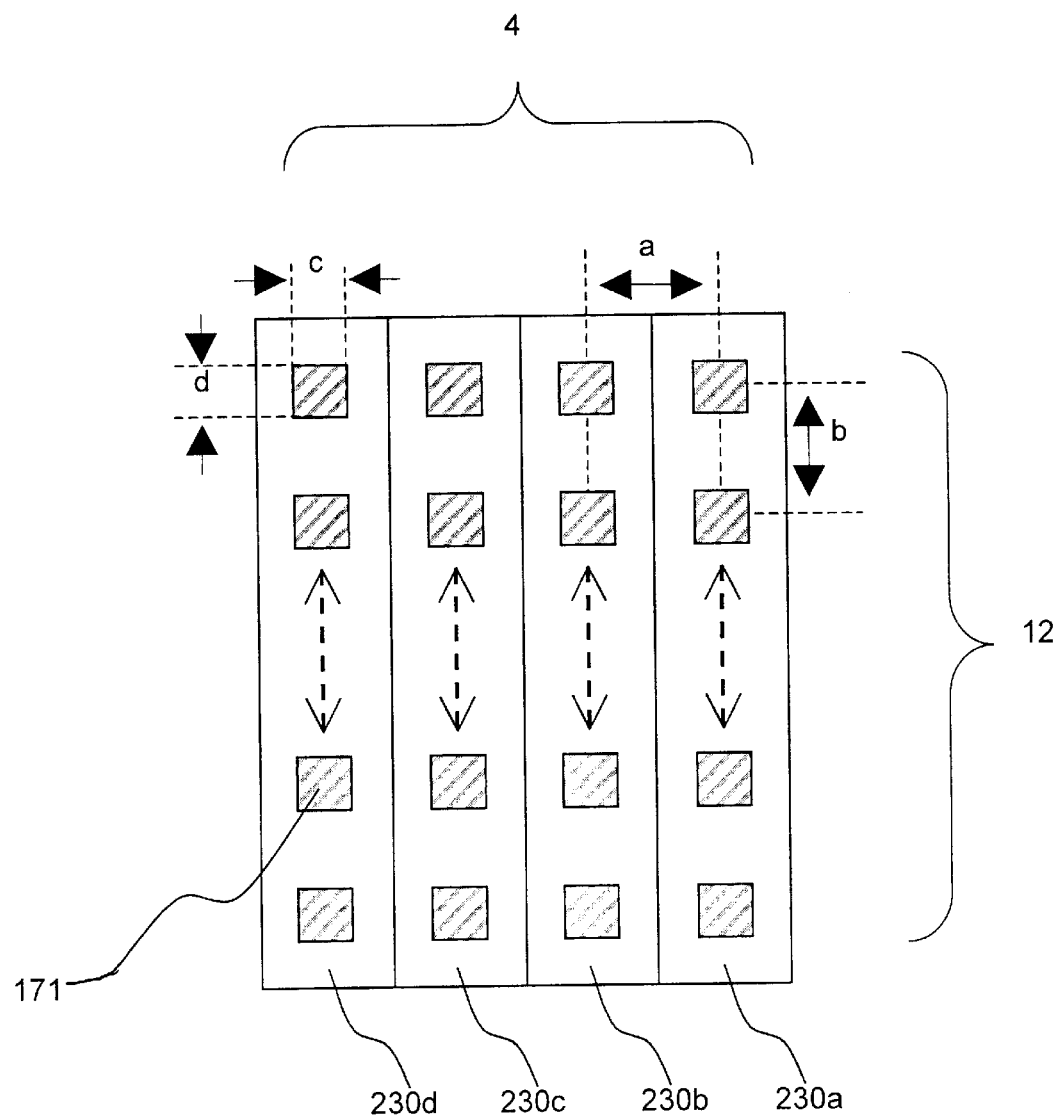
FIG. 7 is an end view of a stack of four waveguide sheets 4×12 showing the pitch and spacing dimensions for matching the footprint of the VCSEL array

FIG. 7 is an end view on the ASIC side of a stack of four waveguide sheets 230a–230d creating a 4×12 array of waveguides 171. The 4×12 array of FIG. 7 is aligned with ASIC 150 and held in position with anchor plate 155 in combination with waveguide housing members 205a, 205b. It is important to note that waveguide assembly 190 is not limited to a stack of four waveguide sheets 230a–230d. In alternative embodiments, any number of waveguide sheets may be stacked.

Figure 8:
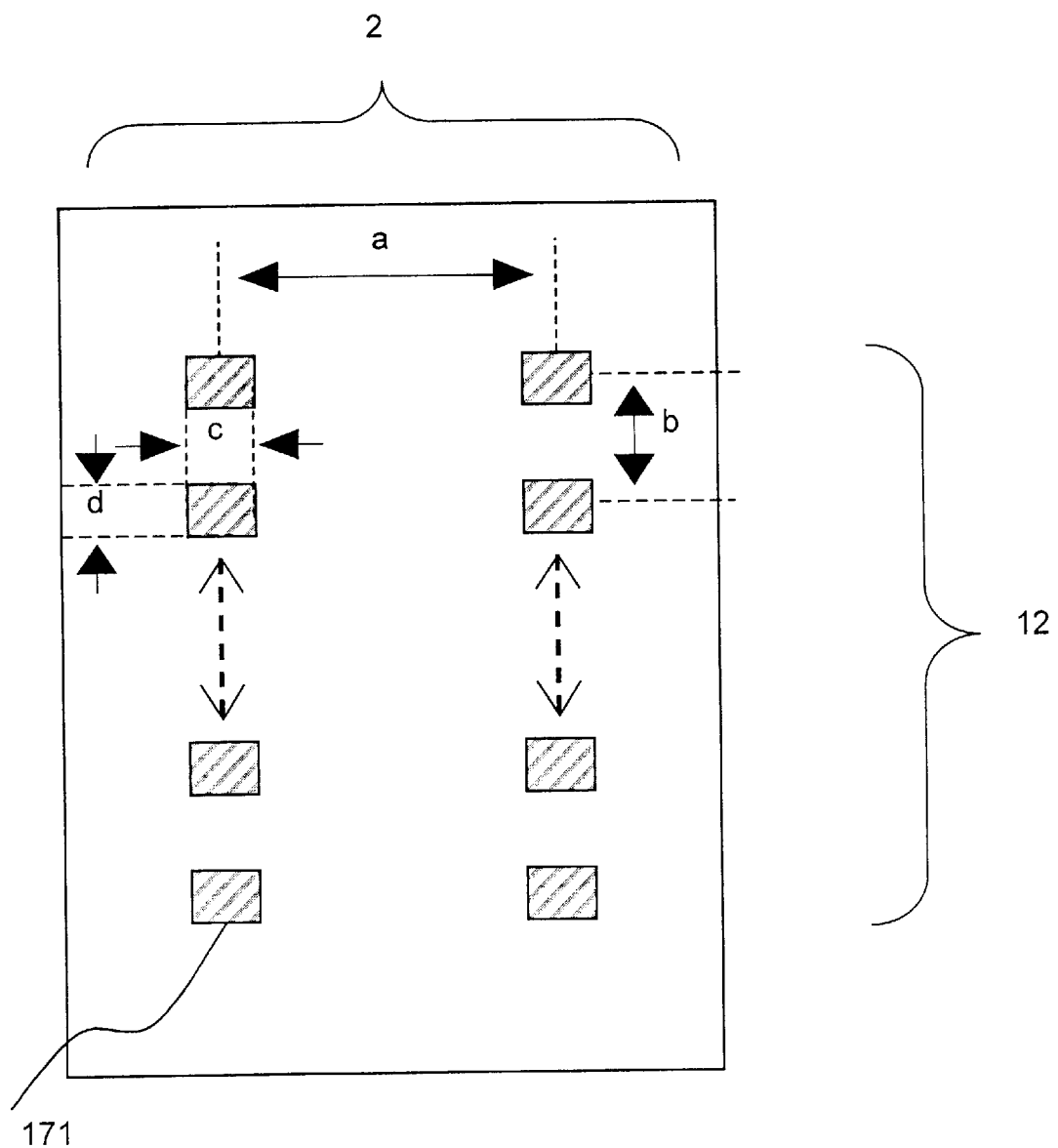
FIG. 8 is a detailed end view of a 2×12 ferrule showing the pitch and spacing dimensions for matching the footprint of the optical connector

FIG. 8 shows a detailed end view of a 2×12 ferrule 170a containing a 2×12 array of waveguides 171 on a different pitch as compared with FIG. 7. Standard 2×12 ferrule 170a allows waveguide assembly 190 to mate to conventional fiber optic connectors by employing the flexible waveguides 171 of the waveguide assembly's 230a–d.

Waveguide assembly 190 of the present invention allows a pitch transition from the optoelectronic array embedded in ASIC 150 to a standard pitch of 2×12 ferrules 170a, 170b. Table 1 below shows an example of the waveguide array dimensions.

The various pitch dimensions and waveguide sizes are shown as a–d as follows:

a—pitch dimension between waveguide sheets (row spacing)

b—pitch spacing between individual waveguides in the column of the waveguide sheet c—the horizontal or 'x' plane dimension of the waveguide d—the vertical or 'y' plane dimension of the waveguide In a preferred embodiment, the dimensions of the various ends of the waveguide as shown in Table 1.

TABLE 1

| | a | b | c | d |
|---|---|---|---|---|
| FIG. 7: ASIC side of waveguide sheet 230 (stacked array) | 125 $\mu$m | 125 $\mu$m | 30–50 $\mu$m | 30–50 $\mu$m |
| FIG. 8: 2 × 12 ferrule 170 array | 500 $\mu$m | 250 $\mu$m | 30–50 $\mu$m | 30–50 $\mu$m |

In one example, each waveguide 171 of waveguide sheet 230a–d is 30 to 50 $\mu$m square in cross-section, and between 3 and 5 cm long. It is desirable to minimize the length of each waveguide 171 to avoid excessive light loss. As discussed, the spacing between the waveguides 171 is defined as pitch, and can be varied at either end of the waveguide sheet for the waveguide column spacing, and the dimension between waveguide sheets establishes the row pitch. The waveguide assembly 190 allows a pitch transition from the pitch of the optoelectronic array embedded in ASIC 150 to a different pitch of the 2×12 ferrule 170a. This feature permits the present invention to be used with legacy systems and allows an interface between an optoelectronic array having any density or pitch to a standard connector.

In one example, the 30 to 50 $\mu$m square cross-sections of waveguides 171 are suitably sized to interface with a standard fiber having a core diameter of 62.5 $\mu$m. In alternative embodiments, other geometries are possible. The ability to provide a low headroom 90 degree bend also provides significant advantages heretofore unknown. As shown in FIG. 5B, the bend radius has a relatively small bending radius, as compared to glass fibers.

One advantage of the present invention is a waveguide assembly that couples light from a two-dimensional optoelectronic array to fiber optic bundles. A second advantage of the present invention is a waveguide assembly that provides a pitch transition from a two-dimensional optoelectronic array to a standard ribbon fiber. A third advantage of the present invention is a waveguide assembly that provides a low, profile (90 degree) transition from a two-dimensional optoelectronic array to fiber optic bundles. A fourth advantage of the present invention is that the waveguide assembly provides high precision placement of waveguide channels. A fifth advantage of the present invention is that the waveguide assembly is easily scalable to various optoelectronic array configurations. A sixth advantage of the present invention is that the waveguide is easily and inexpensively manufactured. A seventh advantage of the present invention is that the waveguide assembly can be terminated directly to a standard ferrule connection, which reduces the overall cost of manufactured devices.

Numerous characteristics and advantages have been set forth in the foregoing description, together with details of structures and functions, and the novel features thereof are pointed out in appended claims. The disclosure, however, is illustrative only, and changes may be made in arrangement and details, within the principle of the invention, to the full extent indicated by the broad general meaning of the terms in which the appended claims are expressed.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. A system for the connection of optoelectronic arrays to optical cable, said system comprising:

at least one two-dimensional optoelectronic array having a plurality of optoelectric devices arraigned in a compact geometery;

a plurality of flexible waveguide sheets, having array and connector ends;

a plurality of one-dimensional waveguides, having first and second ends, disposed within and coterminous with said waveguide sheets;

said first end having a first pitch;

said second end having a second pitch, wherein said second pitch differs from said first pitch;

said first ends of said waveguides are disposed within said array ends of said waveguide sheets and are disposed so as to match said compact geometry of said devices within said array; and said second ends of said waveguides are disposed within said connector ends of said waveguide sheets and are disposed so as to mate with a connector having an industry standard geometry.

2. The system according to claim 1, further comprising a waveguide housing assembly retaining said waveguide sheets and controlling a row spacing between said waveguide sheets to match said compact geometry of said devices.

3. The system according to claim 2, further comprising an anchor plate that interconnects with said waveguide housing.

4. The system according to claim 1, wherein said first pitch between each of said waveguides is designed to match said compact geometry of said devices and said second pitch between each of said waveguides is designed to match said industry standard geometry.

5. The system according to claim 1, said waveguide sheets being generally rectangular and having a protrusion, wherein said waveguides terminate at said protrusion.

6. The system according to claim 1, wherein said waveguides are bendable within said waveguide sheets.

7. The system according to claim 1, wherein said waveguide sheets are grouped at said connector end to connect to one or more ferrules.

8. A low-profile optical assembly for interfacing a two-dimensional optoelectronic array to an optical connector, comprising:

two or more flexible waveguide sheets, wherein each of said waveguide sheets has an array end and a connector end;

a plurality of one-dimensional waveguides in each of said waveguide sheets, wherein each of said waveguides has an array end pitch at said any end and a connector end pitch at said connector end, and wherein said array end pitch matches a pitch of said optoelectronic array and said connector end pitch matches a pitch of said optical connector; and wherein said pitch of said optoelectronic array and said pitch of said optical connector are not equal; and a waveguide housing at said array end of said waveguide sheets for retaining said waveguide sheets, wherein each of said waveguide sheets has an array end spacing at said array end and a connector end spacing at said connector end, and wherein said array end spacing matches a spacing at said optoelectronic array and said connector end spacing matches a spacing at said optical connector.

9. The low-profile optical assembly according to claim 8, further comprising an anchor plate that interconnects with said waveguide housing.

10. The low-profile optical assembly according to claim 9, said waveguide sheets being generally rectangular and having a protrusion extending beyond a plane of said anchor plate, wherein said waveguides terminate in said protrusion.

11. The low-profile optical assembly according to claim 8, wherein said waveguides are bendable within said waveguide sheets.

12. The low-profile optical assembly according to claim 8, wherein said waveguide sheets are grouped at said connector end to connect to one or more ferrules.

* * * * *